US 12,224,580 B1

(12) United States Patent
Hao et al.

(10) Patent No.: US 12,224,580 B1
(45) Date of Patent: Feb. 11, 2025

(54) MULTI-FUNCTION CONVERTER UNIT

(71) Applicant: GM GLOBAL TECHNOLOGY OPERATIONS LLC, Detroit, MI (US)

(72) Inventors: Lei Hao, Troy, MI (US); Shuonan Xu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/359,401

(22) Filed: Jul. 26, 2023

(51) Int. Cl.
*H02J 1/08* (2006.01)
*B60L 53/20* (2019.01)
*H02M 3/155* (2006.01)

(52) U.S. Cl.
CPC ............. *H02J 1/082* (2020.01); *B60L 53/20* (2019.02); *H02J 1/084* (2020.01); *H02M 3/155* (2013.01); *B60L 2210/10* (2013.01)

(58) Field of Classification Search
CPC . H02J 1/082; H02J 1/084; B60L 53/20; B60L 2210/10; H02M 3/155
USPC ......................................................... 307/9.1
See application file for complete search history.

(56) References Cited

U.S. PATENT DOCUMENTS

| | | | |
|---|---|---|---|
| 2017/0113567 A1* | 4/2017 | Koketsu | B60L 15/007 |
| 2018/0361861 A1 | 12/2018 | Bando | |
| 2018/0361865 A1* | 12/2018 | Bando | B60L 53/30 |
| 2022/0032803 A1* | 2/2022 | Hao | B60L 50/66 |
| 2023/0150378 A1 | 5/2023 | Hao et al. | |

FOREIGN PATENT DOCUMENTS

DE          102021131709 A1          5/2023

OTHER PUBLICATIONS

German Office action dated Jan. 31, 2024 for DE serial No. 102023128156.9, 6 pgs.

* cited by examiner

*Primary Examiner* — Richard Tan
(74) *Attorney, Agent, or Firm* — CANTOR COLBURN LLP

(57) ABSTRACT

Techniques are provided for activating a plurality of power features of a vehicle. In one embodiment, the techniques involve controlling a plurality of switches of a multi-function converter unit configuration to activate at least one of the plurality of power features of the vehicle, wherein the multi-function converter unit configuration includes a multi-function converter unit, at least one charge port, and a load.

20 Claims, 12 Drawing Sheets

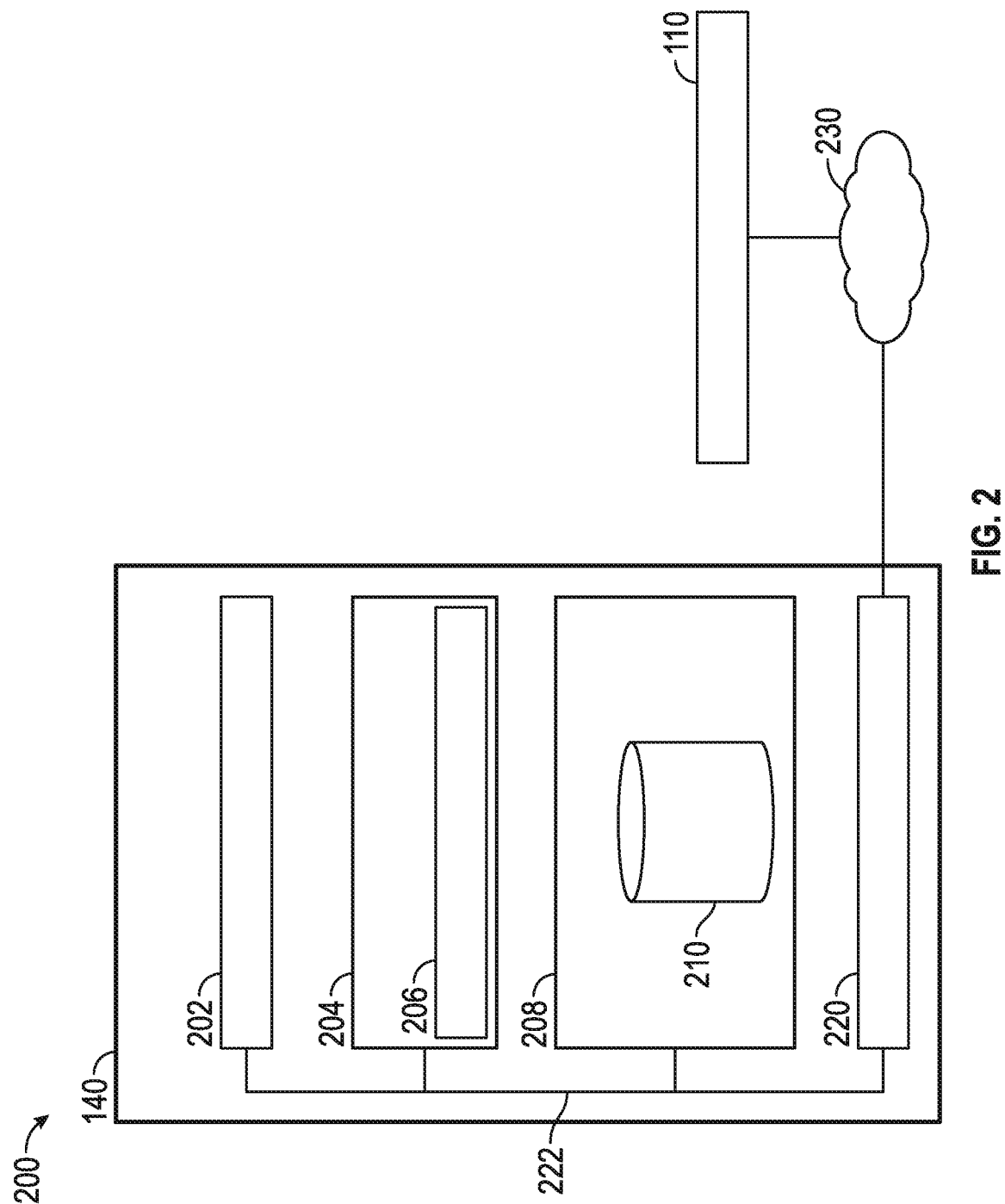

| | S1 | S2 | S3 | S4 | SM | SE | SP | SEP | SPP | DC-DC Converter |
|---|---|---|---|---|---|---|---|---|---|---|
| Power Transfer | On | On | Off | Off | Off | On | On | Off | Off | On |
| Pre-charging | Off | Off | Off | Off | Off | Off | Off | On | On | Off |
| Charging Second Vehicle ESS | Off | Off | On | On | Off | On | Off | Off | Off | On |
| Charging from the Compatible Grid | On | On | Off | On | Off | On | On | Off | Off | On or Off |
| Charging from the Incompatible Grid | Off | Off | On | On | Off | On | Off | Off | Off | On |

FIG. 3B

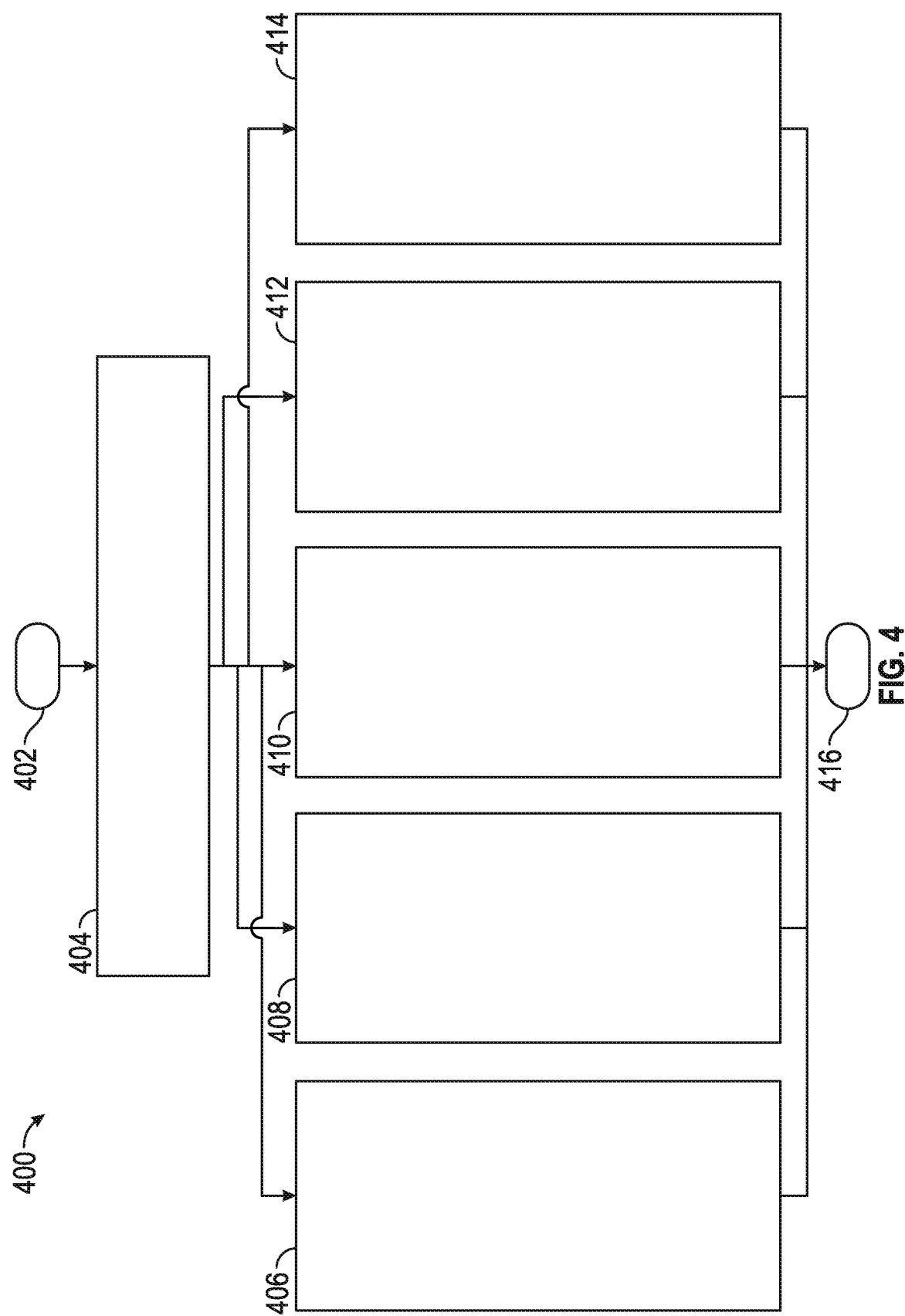

| | S1 | S2 | S3 | S4 | SM | SE | SP | SEP | SPP | DC-DC Converter |
|---|---|---|---|---|---|---|---|---|---|---|
| Power Transfer | On | On | Off | Off | Off | On | On | Off | Off | On |
| Pre-charging | Off | Off | Off | Off | Off | Off | Off | On | On | Off |
| Charging Second Vehicle ESS | Off | Off | On | On | Off | Off | On | Off | Off | On |
| Charging from the Compatible Grid | On | On | Off | On | Off | On | On | Off | Off | On or Off |
| Charging from the Incompatible Grid | Off | Off | On | On | Off | Off | On | Off | Off | On |

FIG. 5B

| | S1 | S2 | S3 | S4 | SM | SE | SP | SEP | SPP | DC-DC Converter |
|---|---|---|---|---|---|---|---|---|---|---|
| Power Transfer | On | On | Off | Off | Off | On | On | Off | Off | On |
| Pre-charging | Off | Off | Off | Off | Off | Off | Off | On | On | Off |
| Charging Second Vehicle ESS | Off | Off | On | On | Off | On | Off | Off | Off | On |
| Charging from the Compatible Grid | On | On | Off | On | Off | On | On | Off | Off | On or Off |
| Charging from the Incompatible Grid | Off | Off | On | On | Off | On | Off | Off | Off | On |

FIG. 6B

| | S1 | S2 | S3 | S4 | S5 | SM | SE | SP | SEP | SPP | DC-DC Converter |
|---|---|---|---|---|---|---|---|---|---|---|---|
| Power Transfer | On | On | Off | Off | Off | Off | On | On | Off | Off | On |
| Pre-charging | Off | Off | Off | Off | Off | Off | Off | Off | On | On | Off |
| Charging Second Vehicle ESS | Off | Off | On | On | Off | Off | On | Off | Off | Off | On |
| Charging from the Compatible Grid | On | On | Off | Off | On or Off | Off | On | On | Off | Off | On or Off |
| Charging from the Incompatible Grid | Off | Off | On | On | Off | Off | On | Off | Off | Off | On |
| Charging from the Compatible Grid, and Charging Another Vehicle with an Incompatible Grid | On | On | On | On | Off | Off | On | Off | Off | Off | On |
| Charging from the Incompatible Grid, and Charging Another Vehicle with an Incompatible Grid | On | On | On | On | Off | Off | On | Off | Off | Off | On |

FIG. 7B

MULTI-FUNCTION CONVERTER UNIT

INTRODUCTION

The subject disclosure relates to direct current (DC)-DC converters of electric vehicles, and more specifically, to controllable multi-function converter unit configurations that enable power features for energy storage systems of electric vehicles.

A DC-DC converter is an electronic circuit that converts a direct current (DC) signal from a first voltage level to a second voltage level. However, DC-DC converters can lack circuit configurations and control algorithms that enable vehicle power features.

SUMMARY

In one exemplary embodiment, a system is provided to activate a plurality of power features of a first vehicle. The system includes a processor, a multi-function converter unit comprising a DC-DC converter including a first terminal, a second terminal, a third terminal, and a fourth terminal, a first electrical path including a first voltage source connected to a first energy switch, wherein the first electrical path is connected to the first terminal and the second terminal, a second electrical path including the first voltage source connected to a first pre-charge resistor connected to a first energy pre-charge switch, wherein the second electrical path is connected to the first terminal and the second terminal, a third electrical path including a second voltage source connected to a second energy switch, wherein the third electrical path is connected to the third terminal and the fourth terminal, a fourth electrical path including the second voltage source connected to a second energy pre-charge resistor connected to a second energy pre-charge switch, wherein the fourth electrical path is connected to the third terminal and the fourth terminal, and a relay switch connected to the fourth terminal, and memory or storage comprising an algorithm or computer instructions, which when executed by the processor, performs an operation comprising controlling a plurality of switches of a multi-function converter unit configuration to activate at least one of the plurality of power features of the first vehicle, wherein the multi-function converter unit configuration includes the multi-function converter unit.

In addition to one or more of the features described herein, the operation also includes activating a first power feature of the plurality of power features, wherein the first power feature represents a power transfer between the first voltage source and the second voltage source of the multi-function converter unit configuration.

In addition to one or more of the features described herein, the operation also includes activating a second power feature of the plurality of power features, wherein the second power feature represents a pre-charging of the first voltage source and the second voltage source of the multi-function converter unit configuration.

In addition to one or more of the features described herein, the operation also includes activating a third power feature of the plurality of power features, wherein the third power feature involves charging of an energy storage system of a second vehicle.

In addition to one or more of the features described herein, the operation also includes activating a fourth power feature of the plurality of power features, wherein the fourth power feature involves charging an element of the multi-function converter unit configuration via a grid that is compatible with the first vehicle.

In addition to one or more of the features described herein, the operation also includes activating a fifth power feature of the plurality of power features, wherein the fifth power feature involves charging an element of the multi-function converter unit configuration via a grid that is incompatible with the first vehicle.

In addition to one or more of the features described herein, the operation also includes activating a sixth power feature of the plurality of power features, wherein the sixth power feature involves simultaneously charging an element of the multi-function converter unit configuration via a first grid that is compatible with the first vehicle and a charging a second vehicle via a second grid that is incompatible with the second vehicle.

In addition to one or more of the features described herein, the operation also includes activating a seventh power feature of the plurality of power features, wherein the seventh power feature involves simultaneously charging an element of the multi-function converter unit configuration via a first grid that is incompatible with the first vehicle and a charging a second vehicle via a second grid that is incompatible with the second vehicle.

In addition to one or more of the features described herein, the multi-function converter unit configuration further includes a first switch connected to a first charge port of the first vehicle and the first terminal, a second switch connected to the first charge port and the second terminal, a third switch connected to the first charge port and the third terminal, a fourth switch connected to the first charge port and the fourth terminal, and a load connected to the third terminal and the fourth terminal via the relay switch.

In addition to one or more of the features described herein, the multi-function converter unit configuration further includes a first switch connected to a second charge port of a second vehicle and the first terminal, a second switch connected to the second charge port and the second terminal, a third switch connected to a first charge port of the first vehicle and the third terminal, a fourth switch connected to the first charge port and the fourth terminal, a fifth switch connected to the first charge port and the first terminal, and a load connected to the third terminal and the fourth terminal via the relay switch.

In another exemplary embodiment, a multi-function converter unit is provided to activate a plurality of power features of a first vehicle. The multi-function converter unit includes a DC-DC converter including a first terminal, a second terminal, a third terminal, and a fourth terminal, a first electrical path including a first voltage source connected to a first energy switch, wherein the first electrical path is connected to the first terminal and the second terminal, a second electrical path including the first voltage source connected to a first pre-charge resistor connected to a first energy pre-charge switch, wherein the second electrical path is connected to the first terminal and the second terminal, a third electrical path including a second voltage source connected to a second energy switch, wherein the third electrical path is connected to the third terminal and the fourth terminal, a fourth electrical path including the second voltage source connected to a second energy pre-charge resistor connected to a second energy pre-charge switch, wherein the fourth electrical path is connected to the third terminal and the fourth terminal, and a relay switch connected to the fourth terminal, wherein a plurality of switches of a multi-function converter unit configuration can be controlled to activate at least one of the plurality of power features of the first vehicle, wherein the multi-function converter unit configuration includes the multi-function converter unit.

In addition to one or more of the features described herein, the multi-function converter unit configuration can be further controlled to activate a first power feature of the plurality of power features, wherein the first power feature represents a power transfer between the first voltage source and the second voltage source of the multi-function converter unit configuration.

In addition to one or more of the features described herein, the multi-function converter unit configuration can be further controlled to activate a second power feature of the plurality of power features, wherein the second power feature represents a pre-charging of the first voltage source and the second voltage source of the multi-function converter unit configuration.

In addition to one or more of the features described herein, the multi-function converter unit configuration can be further controlled to activate a third power feature of the plurality of power features, wherein the third power feature involves charging of an energy storage system of a second vehicle.

In addition to one or more of the features described herein, the multi-function converter unit configuration can be further controlled to activate a fourth power feature of the plurality of power features, wherein the fourth power feature involves charging an element of the multi-function converter unit configuration via a grid that is compatible with the first vehicle.

In addition to one or more of the features described herein, the multi-function converter unit configuration can be further controlled to activate a fifth power feature of the plurality of power features, wherein the fifth power feature involves charging an element of the multi-function converter unit configuration via a grid that is incompatible with the first vehicle.

In addition to one or more of the features described herein, the multi-function converter unit configuration can be further controlled to activate a sixth power feature of the plurality of power features, wherein the sixth power feature involves simultaneously charging an element of the multi-function converter unit configuration via a first grid that is compatible with the first vehicle and a charging a second vehicle via a second grid that is incompatible with the second vehicle.

In addition to one or more of the features described herein, the multi-function converter unit configuration can be further controlled to activate a seventh power feature of the plurality of power features, wherein the seventh power feature involves simultaneously charging an element of the multi-function converter unit configuration via a first grid that is incompatible with the first vehicle and a charging a second vehicle via a second grid that is incompatible with the second vehicle.

In addition to one or more of the features described herein, the multi-function converter unit configuration further includes a first switch connected to a first charge port of the first vehicle and the first terminal, a second switch connected to the first charge port and the second terminal, a third switch connected to the first charge port and the third terminal, a fourth switch connected to the first charge port and the fourth terminal, and a load connected to the third terminal and the fourth terminal via the relay switch.

In addition to one or more of the features described herein, the multi-function converter unit configuration further includes a first switch connected to a second charge port of a second vehicle and the first terminal, a second switch connected to the second charge port and the second terminal, a third switch connected to a first charge port of the first vehicle and the third terminal, a fourth switch connected to the first charge port and the fourth terminal, a fifth switch connected to the first charge port and the first terminal, and a load connected to the third terminal and the fourth terminal via the relay switch.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 2 illustrates a computing environment, according to an embodiment;

FIG. 3B illustrates a first switch state chart of a first multi-function converter unit configuration, according to an embodiment;

FIG. 4 illustrates a flowchart of a method of controlling a first multi-function converter unit configuration, according to an embodiment;

FIG. 5B illustrates a second switch state chart of a second multi-function converter unit configuration, according to an embodiment;

FIG. 6B illustrates a third switch state chart of a third multi-function converter unit configuration, according to an embodiment;

FIG. 7B illustrates a fourth switch state chart of a fourth multi-function converter unit configuration, according to an embodiment.

DETAILED DESCRIPTION

Figure 1:
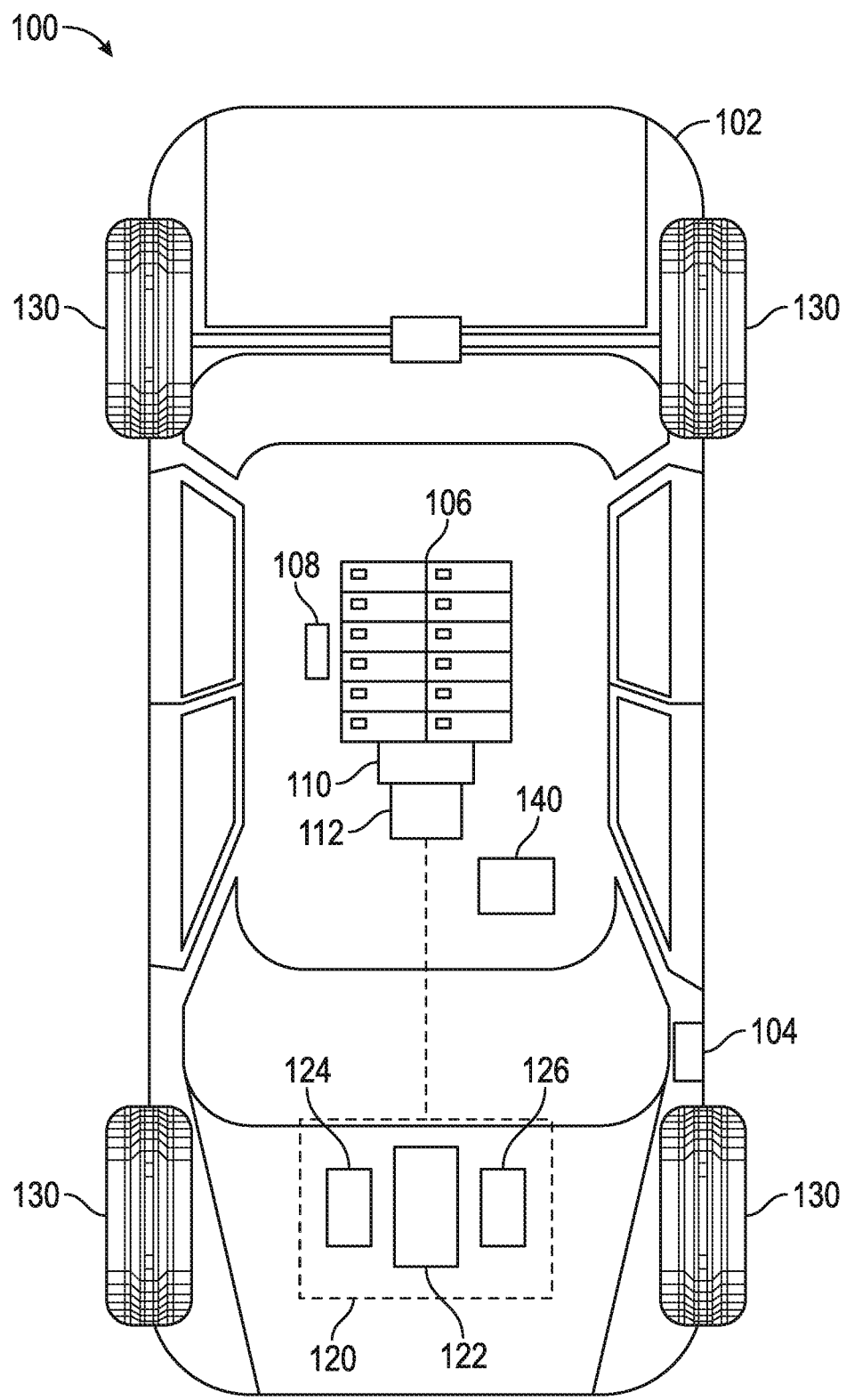
FIG. 1 illustrates a vehicle, according to an embodiment.

The following description is merely exemplary in nature and is not intended to limit the present disclosure, its application or uses. It should be understood that throughout the drawings, corresponding reference numerals indicate like or corresponding parts and features. As used herein, the term "unit" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. Further, as used herein, the term "module" may refer to one or more algorithms, instruction sets, software applications, or other computer-readable program code that can be executed by a processor to perform the functions, operations, or processes described herein.

Embodiments of the present disclosure improve upon charging systems by providing multi-function converter (MFC) unit configurations that enable vehicle power features, which supply power from at least one vehicle charge port to elements (e.g., a load or energy storage system (ESS)) of the MFC unit configurations. Examples of the vehicle power features include ESS power transfers, ESS pre-charging, multi-vehicle charging (e.g., vehicle to vehicle charging), element charging via grids that are compatible or incompatible with the vehicle, and the like. In one embodiment, the MFC unit configurations include multiple switches, at least one charge port, and the load. The switches can be controlled to activate the vehicle power features.

One benefit of the disclosed embodiments is to enable multiple, controllable charging options for vehicle systems by expanding the functionality of a direct current (DC)-DC converter of an electric vehicle.

FIG. 1 illustrates a vehicle 100, according to an embodiment. The vehicle 100 includes a body 102, which can support a first charge port 104, a power system 106, sensor system 108, propulsion system 120, a controller 140, and other systems of the vehicle 100 described herein.

In one embodiment, the vehicle 100 is an internal combustion engine (ICE) vehicle, an electric vehicle (EV), or a hybrid electric vehicle (HEV). In the illustrated embodiment, the vehicle 100 is an HEV that is partially powered by the power system 106, which includes multiple interconnected battery cells. The power system 106 can be charged via the first charge port 104 that is connected to a power source (e.g., a grid, a charging station, another vehicle, or the like).

The power system 106 can be electrically coupled to at least one electric motor assembly of the propulsion system 120. In one embodiment, the power system 106 is electrically coupled to a multi-function converter (MFC) unit 110 and an inverter unit 112 (e.g., a traction power inversion unit). In one embodiment, the MFC unit 110 can be configured to include elements such as multiple switches, at least one charge port (e.g., the charge port 103), and a load (e.g., the propulsion system 120, the power system 106, an energy storage system of a second vehicle, or the like). The inverter unit 112 can include multiple inverters that convert DC signals from the power system 106 to three-phase alternating current (AC) signals to drive electric motors of the propulsion system 120. The power system 106 can also be electrically coupled to vehicle electronics systems such as audio systems, display systems, navigation systems, temperature control systems, or the like.

The sensor system 108 includes a variety of sensors disposed on, or integrated with, various components of the vehicle 100. In one embodiment, the sensor system 108 is communicatively coupled to the controller 140. The sensor system 108 may include a current sensor, a voltage sensor, a temperature sensor, or the like.

The propulsion system 120 can include an ICE system 122 and at least one electric motor assembly (e.g., a first electric motor 124 and a second electric motor 126). Each component of the propulsion system 120 can be configured to drive at least one the wheels 130 of the vehicle 100 via a transmission system coupled to a front axle shaft or a rear axle shaft, which are coupled to a respective front and rear set of the wheels 130.

In one embodiment, the controller 140 is configured to control the multiple switches of an MFC unit configuration to activate the vehicle power features. The controller is discussed in greater detail in FIG. 2.

Configurations of the MFC unit 110, and corresponding switch state charts for enabling vehicle power features, are described in FIGS. 3A-3B, 5A-5B, 6A-6B, and 7A-7B. Techniques for controlling the switches are described in FIGS. 4 and 8.

FIG. 2 illustrates a computing environment 200, according to an embodiment. In the illustrated embodiment, the computing environment 200 includes a controller 140, network 230, and a MFC unit 110.

In one embodiment, the controller 140 includes a processor 202 that obtains instructions and data via a bus 222 from a memory 204 or storage 208. Not all components of the controller 140 are shown. The controller 140 is generally under the control of an operating system (OS) suitable to perform or support the functions or processes disclosed herein. The processor 202 is a programmable logic device that performs instruction, logic, and mathematical processing, and may be representative of one or more CPUs. The processor may execute one or more algorithms, instruction sets, or applications in the memory 204 or storage 208 to perform the functions or processes described herein.

The memory 204 and storage 208 can be representative of hard-disk drives, solid state drives, flash memory devices, optical media, and the like. The storage 208 can also include structured storage (e.g., a database). In addition, the memory 204 and storage 208 may be considered to include memory physically located elsewhere. For example, the memory 204 and storage 208 may be physically located on another computer communicatively coupled to the controller 140 via the bus 222 or the network 230.

The controller 140 can be connected to other computers (e.g., controllers, distributed databases, servers, or webhosts) or the MFC unit 110 via a network interface 220 and the network 230. Examples of the network 230 include a controller area network (CAN), a transmission control protocol (TCP) bus, electrical busses, physical transmission cables, optical transmission fibers, wireless transmissions mediums, routers, firewalls, switches, gateway computers, edge servers, a local area network, a wide area network, a wireless network, or the like. The network interface 220 may be any type of network communications device allowing the controller 140 to communicate with computers and other components of the computing environment 200 via the network 230.

In the illustrated embodiment, the memory 204 includes a converter control module 206. In one embodiment, the converter control module 206 represents one or more algorithms, instruction sets, software applications, or other computer-readable program code that can be executed by the processor 202 to perform the functions, operations, or processes described herein.

In one embodiment, the converter control module 206 controls switches of the MFC unit 110 to activate vehicle power features. Controlling the switches can include enabling (i.e., closing) or disabling (i.e., opening) each of the switches in accordance with converter control data 210. In one embodiment, the converter control data 210 includes one or more switch state charts that depict switch states for various configurations of the multi-function converter unit 110. The switch states may be depicted as "on" or "off" states, which correspond to "enabled" or "disabled" switches, respectively. These features are described further in FIGS. 3A-3B, 4, 5A-5B, 6A-6B, 7A-7B, and 8, herein.

Figure 3A:
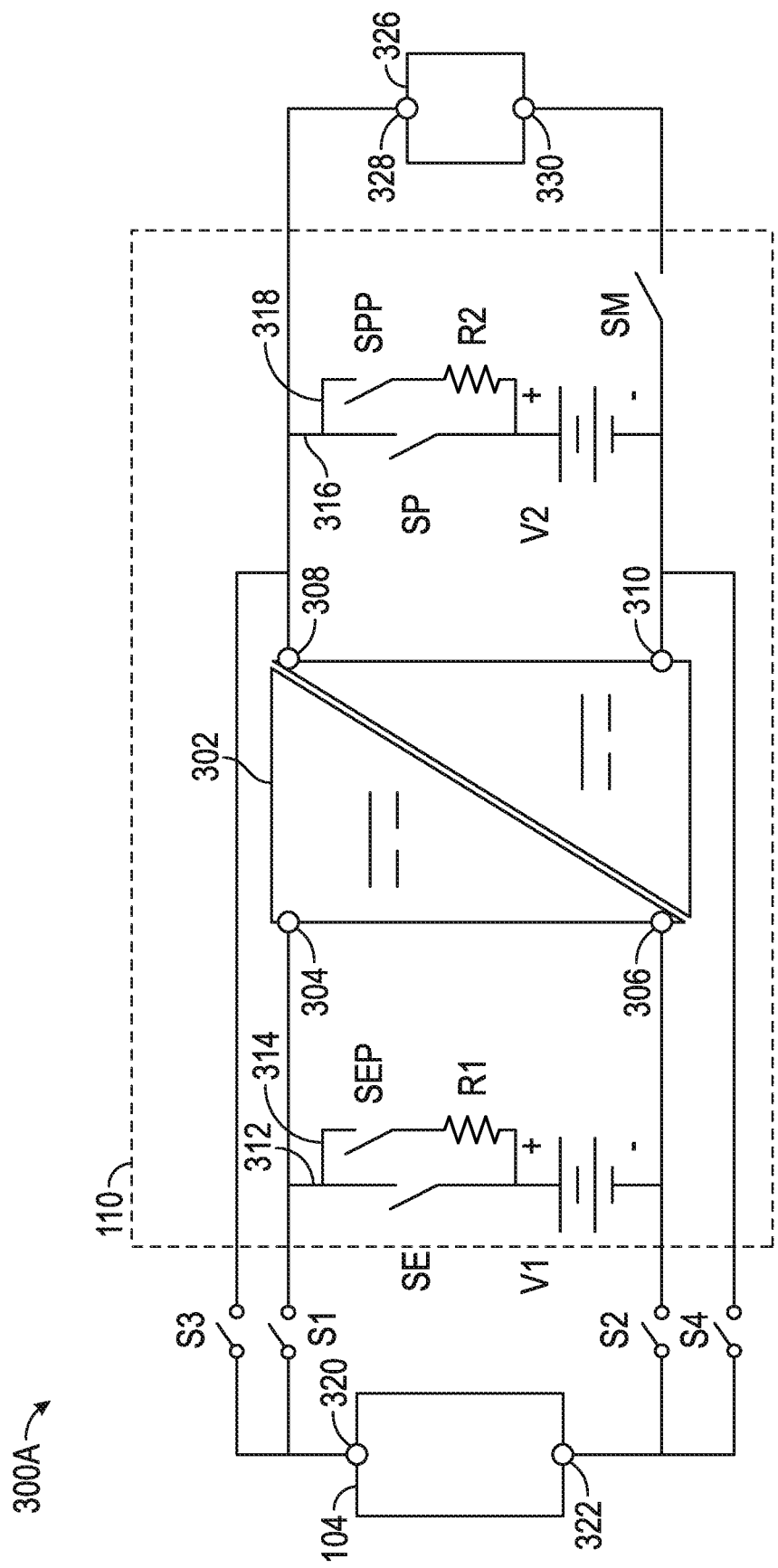
FIG. 3A illustrates a first multi-function converter unit configuration, according to an embodiment.

FIG. 3A illustrates a first multi-function converter unit configuration 300A, according to an embodiment. In the illustrated embodiment, the first MFC unit configuration 300A includes the MFC unit 110, the first charge port 104, a first switch S1, a second switch S2, a third switch S3, a fourth switch S4, and a load 326.

The MFC unit 110 includes a first energy source V1, a first energy switch SE, a first energy pre-charge switch SEP, a first pre-charge resistor R1, a DC-DC converter 302, a second energy source V2, a second energy switch SP, a second energy pre-charge switch SPP, a second pre-charge resistor R2, a relay switch SM, a first electrical path 312, a second electrical path 314, a third electrical path 316, and a fourth electrical path 318.

In one embodiment, the DC-DC converter 302 is a buck-boost DC-DC converter that can decrease or increase a level of a voltage input into the converter. In the illustrated embodiment, the DC-DC converter 302 includes a first terminal 304, a second terminal 306, a third terminal 308, and a fourth terminal 310. The terminals can serve as connection points between elements of the MFC unit 110 and the DC-DC converter 302.

In illustrated embodiment, the first electrical path 312 includes the first voltage source V1 connected to the first energy switch SE. The first voltage source V1 and the second voltage source V2 may be representative of cell groups or battery packs of the power system 106. The first electrical path 312 can be connected to the first terminal 304 and the second terminal 306 of the DC-DC converter 302.

The second electrical path 314 can include the first voltage source V1 connected to the first pre-charge resistor R1 connected to the first energy pre-charge switch SEP. The second electrical path 314 can be connected to the first terminal 304 and the second terminal 306.

The third electrical path 316 can include the second voltage source V2 connected to the second energy switch SP. The third electrical path 316 can be connected to the third terminal 308 and the fourth terminal 310.

The fourth electrical path 318 can include the second voltage source V2 connected to the second energy pre-charge resistor R2 connected to the second energy pre-charge switch SPP. The fourth electrical path 318 can be connected to the third terminal 308 and the fourth terminal 310. Further, the relay switch SM can be connected to the fourth terminal 310.

In the illustrated embodiment, the first charge port 104 is connected to the DC-DC converter 302 via the first switch S1, the second switch S2, the third switch S3, and the fourth switch S4. The first switch S1 can be connected to a first end 320 of the first charge port 104 and the first terminal 304 of the DC-DC converter 302. The second switch S2 can be connected to a second end 322 of the first charge port 104 and the second terminal 306 of the DC-DC converter 302. The third switch S3 can be connected to the first end 320 of the first charge port 104 and the third terminal 308 of the DC-DC converter 302. The fourth switch S4 can be connected to the second end 322 of the first charge port 104 and the fourth terminal 310 of the DC-DC converter 302.

The load 326 can include the propulsion system 120, or other electric-based systems, of the vehicle 100. A first connection point 328 of the load 326 can be connected to the third terminal 308 of the DC-DC converter 302. A second connection point 330 of the load 326 can be connected to the fourth terminal 310 of the DC-DC converter 302 via the relay switch SM.

In one embodiment, the converter control module 206 enables the first energy switch SE and the relay switch SM, and disables the first pre-charge switch SEP, to allow power from the first voltage source V1 to be transferred to the third terminal 308 and the fourth terminal 310 of the DC-DC converter 302, where the power may be supplied to the load 326. The converter control module 206 can also enable the second energy switch SP, and disable the second pre-charge switch SPP, to allow power from the second voltage source V2 to be transferred to the first terminal 304 and the second terminal 306 of the DC-DC converter 302, where the power may be supplied to the first charge port 104.

FIG. 3B illustrates a first switch state chart 300B of a first multi-function converter unit configuration 300A, according to an embodiment. In one embodiment, the first switch state chart 300B depicts combinations of switches states of the first MFC unit configuration 300A that activate vehicle power features. The first switch state chart 300B may show the switches in "on" or "off" states, which correspond to "enabled" (i.e., closed) or "disabled" (i.e., opened) switches, respectively.

The vehicle power features can include a power transfer between the first voltage source V1 to the second voltage source V2 ("Power Transfer"), pre-charging of the first voltage source V1 or the second voltage source V2 ("Pre-charging"), vehicle to vehicle charging ("Charging Second Vehicle ESS"), charging elements of the first MFC unit configuration 300A via grids that are compatible or incompatible with the vehicle ("Charging from the Compatible Grid" and "Charging from the Incompatible Grid"), or the like. Techniques for controlling the switch states to activate the power features are described further in FIG. 4 herein.

FIG. 4 illustrates a flowchart of a method 400 of controlling a first multi-function converter unit configuration 300A, according to an embodiment. The method 400 begins at block 402.

At block 404, the converter control module 206 controls a plurality of switches of a first multi-function converter unit configuration 300A to activate at least one of a plurality of power features of a first vehicle. The switches include the first switch S1, the second switch S2, the third switch S3, the fourth switch S4, the first energy switch SE, the first energy pre-charge switch SEP, the second energy switch SP, the second energy pre-charge switch SPP, and the relay switch SM.

At block 406, the converter control module 206 activates a first power feature ("Power Transfer") of the plurality of power features, where the first power feature represents a power transfer between a first voltage source V1 and a second voltage source V2 of the first MFC unit configuration 300A.

In one embodiment, the converter control module 206 activates the first power transfer feature by enabling the first switch S1, the second switch S2, the first energy switch SE, and the second energy switch SP, and disabling the third switch S3, the fourth switch S4, the relay switch SM, the first pre-charge switch SEP, and the second pre-charge switch SPP. When the power transfer feature is activated, the DC-DC converter 302 is active.

At block 408, the converter control module 206 activates a second power feature ("Pre-charging") of the plurality of power features, where the second power feature represents a pre-charging of the first voltage source and the second voltage source of the first multi-function converter unit configuration 300A. The pre-charging feature can be activated to charge the first voltage source V1 second voltage source V2 (without providing power to the first charge port 104 or the load 326) by controlling the switches of the MFC unit 110 to allow current to flow through the second electrical path 314 to the first voltage source V1, and through the fourth electrical path 318 to the second voltage source V1.

In one embodiment, the converter control module 206 activates the second power feature by enabling the first pre-charging switch SEP and the second pre-charging switch SPP, and disabling the first switch S1, the second switch S2, third switch S3, the fourth switch S4, the relay switch SM, the first energy switch SE, and the second energy switch SP. When the pre-charging feature is activated, the DC-DC converter 302 is deactivated.

At block 410, the converter control module 206 activates a third power feature ("Charging second vehicle energy storage system (ESS)") of the plurality of power features, where the third power feature involves charging of an energy storage system of a second vehicle. In one embodiment, the load 326 includes the energy storage system of the second vehicle.

In one embodiment, the converter control module 206 activates the third power feature that charges the second vehicle ESS by enabling the third switch S3, the fourth switch S4, and the first energy switch SE, and disabling the first switch S1, the second switch S2, the relay switch SM, the second energy switch SP, the first energy pre-charge switch SEP, and the second energy pre-charge switch SPP. When this power feature is activated, the DC-DC converter 302 is active.

At block 412, the converter control module 206 activates a fourth power feature ("Charging from the Compatible Grid") of the plurality of power features, where the fourth power feature involves charging an element (e.g., the first voltage source V1, the second voltage source V2, or the load 326) of the multi-function unit configuration 300A via a grid that is compatible with the first vehicle. In one embodiment, the grid is compatible with the first vehicle when the grid is able to directly supply the rated or recommended charging power of the first vehicle to the load 326 (e.g., the power system 106) via the first charge port 104. For example, a grid that is designed for DC fast charging and supercharging may supply 400-800 volts to the first vehicle. When the first vehicle is designed to charge using 800 volts, for instance, the grid is compatible with the first vehicle.

In one embodiment, the converter control module 206 activates the fourth power feature that charges from a compatible grid by enabling the first switch S1, the second switch S2, the first energy switch SE, and the second energy switch SP, and disabling third switch S3, the fourth switch S4, the relay switch SM, the first energy pre-charge switch SEP, the second energy pre-charge switch SPP. When this power feature is activated, the DC-DC converter 302 may be active or deactivated.

At block 414, the converter control module 206 activates a fifth power feature ("Charging from the Incompatible Grid") of the plurality of power features, where the fifth power feature involves charging an element of the multi-function converter unit configuration 300A via a grid that is incompatible with the first vehicle. In one embodiment, a grid is incompatible with the first vehicle when the grid lacks the capacity or infrastructure to support charging requirements of the first vehicle. For example, a grid that is designed for DC fast charging and supercharging may supply 400-800 volts to the first vehicle via the first charge port 104. However, if the first vehicle is designed to charge using 240 volts, for instance, then the grid is incompatible with the first vehicle. In such circumstances, the converter controller 206 can activate the fifth power feature to step down the voltage (via the DC-DC converter 302) from the charge port 104 to charge load 326 (e.g., the power system 106) or another element of the MFC unit configuration 300A.

In one embodiment, the converter control module 206 activates the fifth power feature that charges from an incompatible grid by enabling the third switch S3, the fourth switch S4, and the first energy switch SE, and disabling the first switch S1, the second switch S2, the relay switch SM, the second energy switch SP, the first energy pre-charge switch SEP, and the second energy pre-charge switch SPP. When this power feature is activated, the DC-DC converter 302 is active. The method 400 ends at block 416.

Figure 5A:
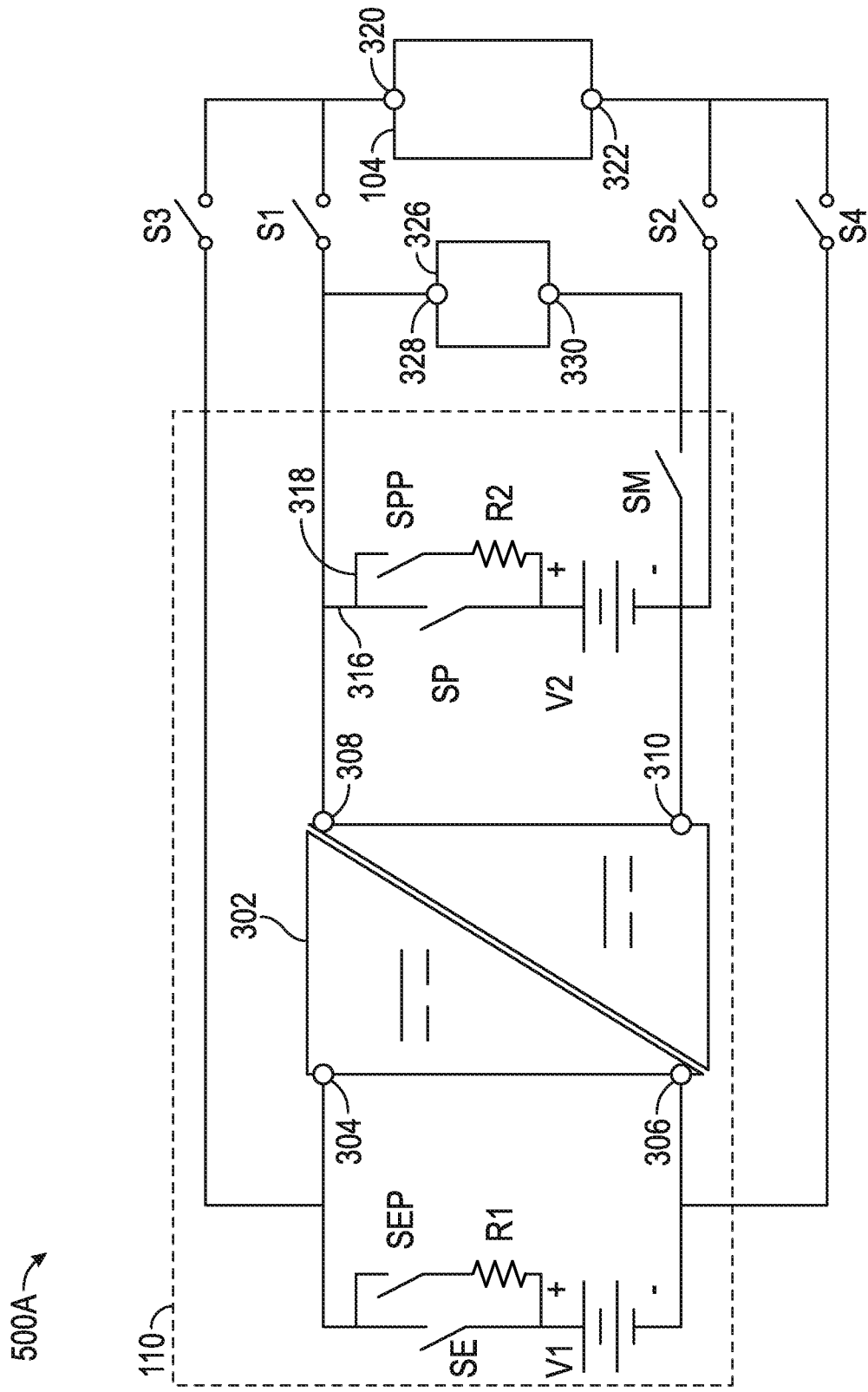
FIG. 5A illustrates a second multi-function converter unit configuration, according to an embodiment.

FIG. 5A illustrates a second multi-function converter unit configuration 500A, according to an embodiment. In the illustrated embodiment, the second MFC unit configuration 500A includes the MFC unit 110, the first charge port 104, the first switch S1, the second switch S2, the third switch S3, the fourth switch S4, and the load 326.

The MFC unit 110 can include the connections, elements, and functions as discussed in FIG. 3A above. For instance, the MFC unit 110 includes the first energy source V1, the first energy switch SE, the first energy pre-charge switch SEP, the first pre-charge resistor R1, the DC-DC converter 302, the second energy source V2, the second energy switch SP, the second energy pre-charge switch SPP, the second pre-charge resistor R2, and the relay switch SM. Further, as discussed above, the load 326 can be connected in parallel to the MFC unit 110.

In the illustrated embodiment, the first charge port 104 is connected to the second MFC unit configuration 500A via the first switch S1, the second switch S2, the third switch S3, and the fourth switch S4. The first switch S1 can be connected to the first end 320 of the first charge port 104 and the third terminal 308 of the DC-DC converter 302. The second switch S2 can be connected to the second end 322 of the first charge port 104 and the fourth terminal 310 of the DC-DC converter 302. The third switch S3 can be connected to the first end 320 of the first charge port 104 and the first terminal 304 of the DC-DC converter 302. The fourth switch S4 can be connected to the second end 322 of the first charge port 104 and the second terminal 306 of the DC-DC converter 302.

FIG. 5B illustrates a second switch state chart 500B of a second multi-function converter unit configuration 500A, according to an embodiment. In one embodiment, the second switch state chart 500B depicts combinations of switches states of the second MFC unit configuration 500A that activate vehicle power features. The second switch state chart 500B may show the switches in "on" or "off" states, which correspond to "enabled" (i.e., closed) or "disabled" (i.e., opened) switches, respectively.

The vehicle power features can include a power transfer between the first voltage source V1 to the second voltage source V2 ("Power Transfer"), pre-charging of the first voltage source V1 or the second voltage source V2 ("Pre-charging"), vehicle to vehicle charging ("Charging Second Vehicle ESS"), charging elements of the second MFC unit configuration 500A via grids that are compatible or incompatible with the vehicle ("Charging from the Compatible Grid" and "Charging from the Incompatible Grid"), or the like.

In one embodiment, the converter control module 206 controls the switches of the second MFC unit configuration 500A to activate at least one of the power features of a first vehicle. The switches include the first switch S1, the second switch S2, the third switch S3, the fourth switch S4, the first energy switch SE, the first energy pre-charge switch SEP, the second energy switch SP, the second energy pre-charge switch SPP, and the relay switch SM.

In the illustrated embodiment, the converter control module 206 can activate the power features of the first vehicle via a process similar to the processes discussed in FIGS. 3B and 4, above. However, the converter control module 206 can activate the third power feature ("Charging second vehicle energy storage system (ESS)") by enabling the third switch S3, the fourth switch S4, and the second energy switch SP, and disabling the first switch S1, the second switch S2, the relay switch SM, the first energy switch SE, the first energy pre-charge switch SEP, and the second energy pre-charge switch SPP.

Further, the converter control module 206 can activate the fifth power feature ("Charging from the Incompatible Grid") by enabling the third switch S3, the fourth switch S4, and the second energy switch SP, and disabling the first switch S1, the second switch S2, the relay switch SM, the first energy switch SE, the first energy pre-charge switch SEP, and the second energy pre-charge switch SPP.

Figure 6A:
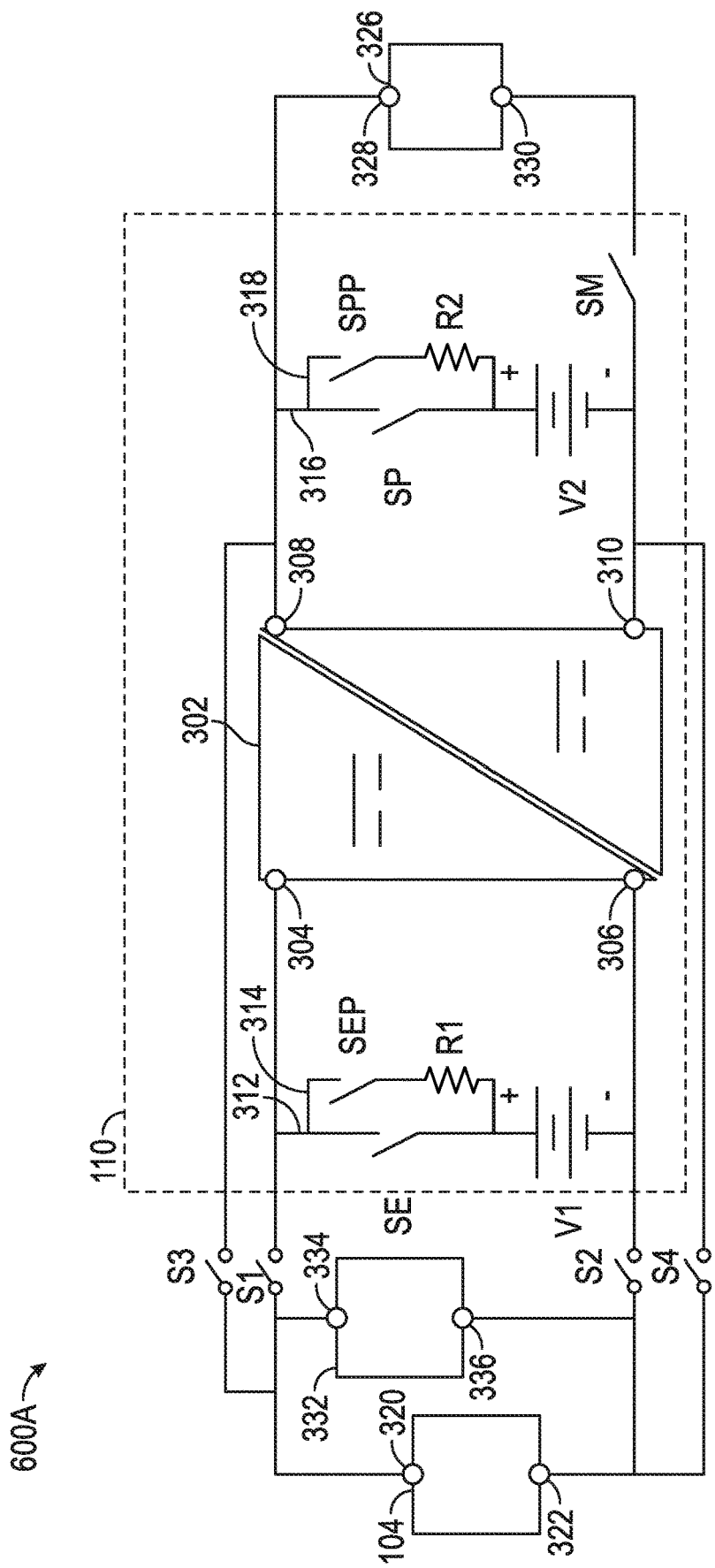
FIG. 6A illustrates a third multi-function converter unit configuration, according to an embodiment.

FIG. 6A illustrates a third multi-function converter unit configuration 600A, according to an embodiment. In the illustrated embodiment, the third MFC unit configuration 600A includes the first MFC unit configuration 300A discussed in FIG. 3A. The third MFC unit configuration 600A further includes a second charge port 332 (which may be included in a second vehicle) connected in parallel with the first charge port 104.

Similar to the connections of the first charge port 104, the second charge port 332 is connected to the third MFC unit configuration 600A via the first switch S1, the second switch S2, the third switch S3, and the fourth switch S4. The first switch S1 can be connected to the first connection point 334 of the second charge port 332 and the first terminal 304 of the DC-DC converter 302. The second switch S2 can be connected to the second connection point 336 of the second charge port 332 and the second terminal 306 of the DC-DC converter 302. The third switch S3 can be connected to the first connection point 334 of the second charge port 332 and the third terminal 308 of the DC-DC converter 302. The fourth switch S4 can be connected to the second connection point 336 of the second charge port 332 and the fourth terminal 310 of the DC-DC converter 302.

FIG. 6B illustrates a third switch state chart 600B of a third multi-function converter unit configuration 600A, according to an embodiment. In one embodiment, the third switch state chart 600B depicts combinations of switches states of the third MFC unit configuration 600A that activate vehicle power features.

The vehicle power features can include a power transfer between the first voltage source V1 to the second voltage source V2 ("Power Transfer"), pre-charging of the first voltage source V1 or the second voltage source V2 ("Pre-charging"), vehicle to vehicle charging ("Charging Second Vehicle ESS"), charging elements of the third MFC unit configuration 600A via grids that are compatible or incompatible with the vehicle ("Charging from the Compatible Grid" and "Charging from the Incompatible Grid"), or the like.

In the illustrated embodiment, the third switch state chart 600B mirrors the first switch state chart 300B discussed above. Therefore, the converter control module 206 can control the switches of the third MFC unit configuration 600A in accordance with the first switch state chart 300B, or the third switch state chart 600B, to activate the power features of the first vehicle, which can supply power to elements of the third MFC unit configuration 600A.

Figure 7A:
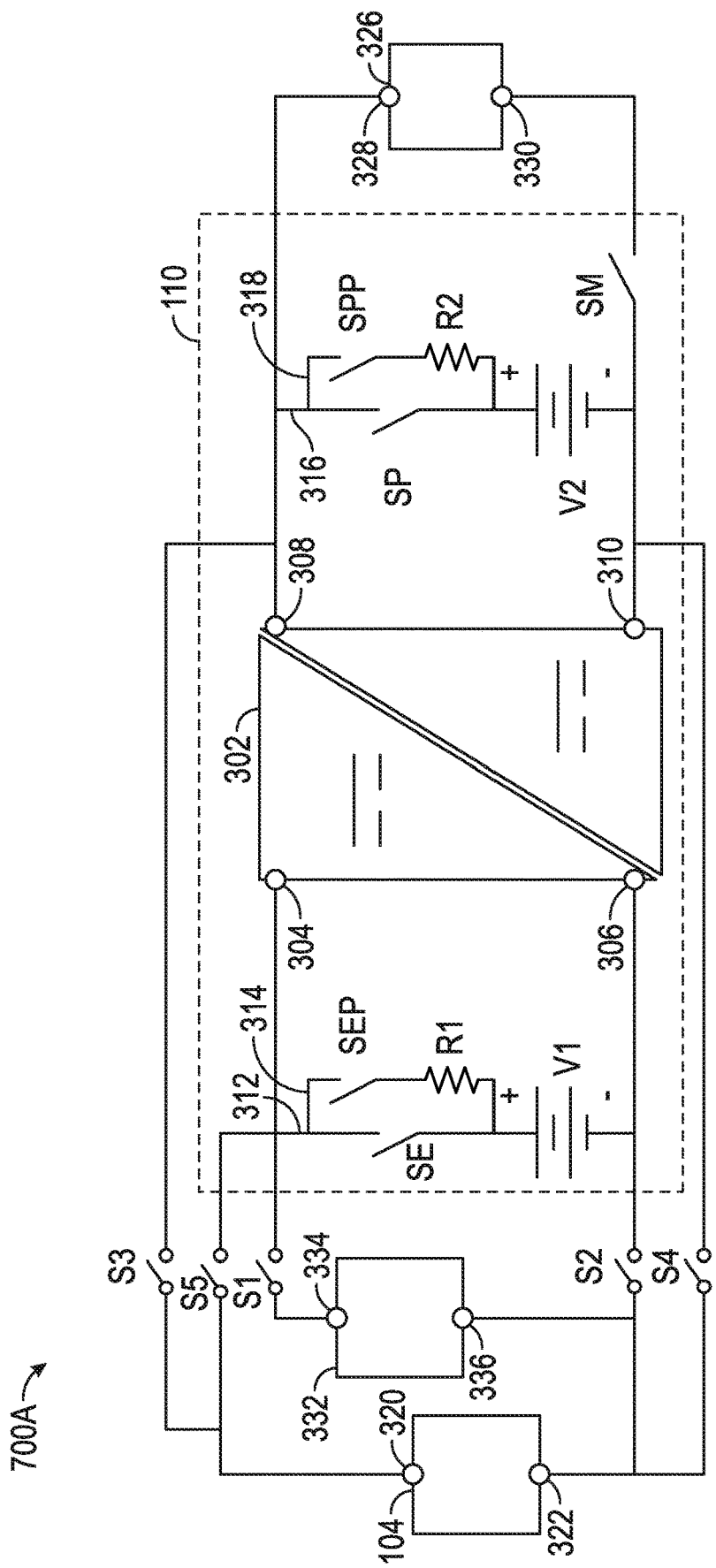
FIG. 7A illustrates a fourth multi-function converter unit configuration, according to an embodiment.

FIG. 7A illustrates a fourth multi-function converter unit configuration 700A, according to an embodiment. In the illustrated embodiment, the fourth MFC unit configuration 700A includes the MFC unit 110, the first charge port 104, the second charge port 332, the first switch S1, the second switch S2, the third switch S3, the fourth switch S4, a fifth switch S5, and the load 326.

The MFC unit 110 can include the connections, elements, and functions as discussed in FIG. 3A above. For instance, the MFC unit 110 includes the first energy source V1, the first energy switch SE, the first energy pre-charge switch SEP, the first pre-charge resistor R1, the DC-DC converter 302, the second energy source V2, the second energy switch SP, the second energy pre-charge switch SPP, the second pre-charge resistor R2, and the relay switch SM. Further, as discussed above, the load 326 can be connected in parallel to the MFC unit 110.

In the illustrated embodiment, the first charge port 104 is connected to the fourth MFC unit configuration 700A via the second switch S2, the third switch S3, the fourth switch S4 and the fifth switch. The second switch S2 can be connected to the second end 322 of the first charge port 104 and the second terminal 306 of the DC-DC converter 302. The third switch S3 can be connected to the first end 320 of the first charge port 104 and the third terminal 308 of the DC-DC converter 302. The fourth switch S4 can be connected to the second end 322 of the first charge port 104 and the fourth terminal 310 of the DC-DC converter 302. The fifth switch S5 can be connected to the first end 320 of the first charge port 104 and the first terminal 304 of the DC-DC converter 302.

The second charge port is connected to the fourth MFC unit configuration 700A via the first switch S1, the second switch S2, and the fourth switch S4. The first switch S1 can be connected to the first connection point 334 of the second charge port 332 and the first terminal 304 of the DC-DC converter 302. The second switch S2 can be connected to the second connection point 336 of the second charge port 332 and the second terminal 306 of the DC-DC converter 302. The fourth switch S4 can be connected to the second connection point 336 of the second charge port 332 and the fourth terminal 310 of the DC-DC converter 302.

FIG. 7B illustrates a fourth switch state chart 700B of a fourth multi-function converter unit configuration 700A, according to an embodiment. In one embodiment, the fourth switch state chart 700B depicts combinations of switches states of the fourth MFC unit configuration 700A that activate vehicle power features. The fourth switch state chart 700B may show the switches in "on" or "off" states, which correspond to "enabled" (i.e., closed) or "disabled" (i.e., opened) switches, respectively.

As discussed above, the vehicle power features can include the first power feature, which involves a power transfer between the first voltage source V1 to the second voltage source V2 ("Power Transfer"); the second power feature, which involves pre-charging of the first voltage source V1 or the second voltage source V2 ("Pre-charging"); a third power feature, which involves vehicle to vehicle charging ("Charging Second Vehicle ESS"); and the fourth and fifth power features, which involve charging elements of the fourth MFC unit configuration 700A via grids that are compatible or incompatible with the vehicle ("Charging from the Compatible Grid" and "Charging from the Incompatible Grid", respectfully), or the like.

As shown in the fourth switch state chart 700B, the fourth MFC unit configuration 700A also enables a sixth power feature ("Charging from the Compatible Grid, and Charging Another Vehicle with an Incompatible Grid") and a seventh power feature ("Charging from the Incompatible Grid, and Charging Another Vehicle with an Incompatible Grid").

Figure 8:
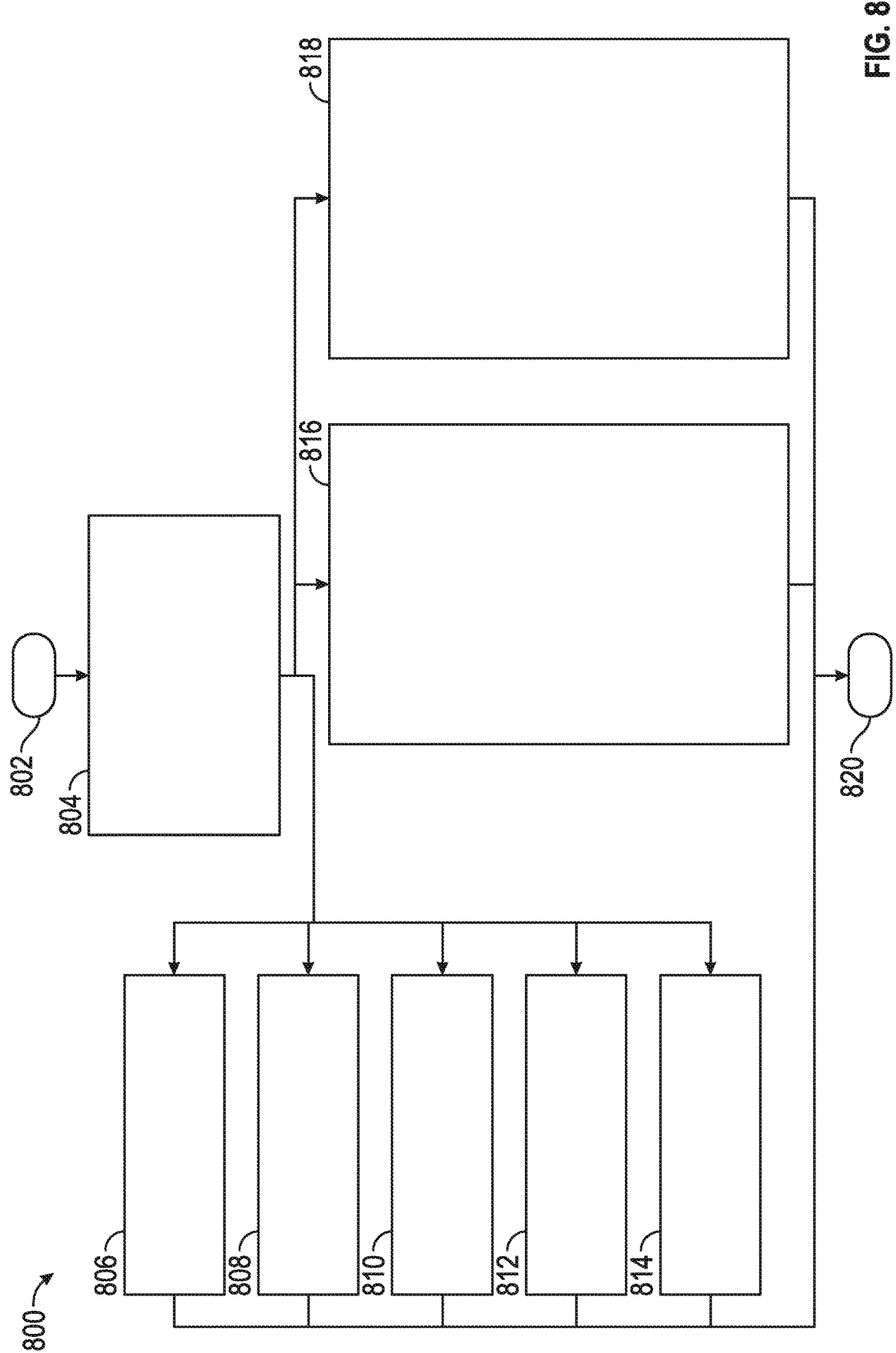
FIG. 8 illustrates a flowchart of a method of controlling a fourth multi-function converter unit configuration, according to an embodiment.

Techniques for controlling the switch states to activate the sixth and seventh power features are described further in FIG. 8 herein.

FIG. 8 illustrates a flowchart of a method 800 of controlling a fourth multi-function converter unit 700A, according to an embodiment. The method 800 begins at block 802.

At block 804, the converter control module 206 controls a plurality of switches of a fourth multi-function converter unit configuration 700A to activate at least one of a plurality of power features of a first vehicle. The switches include the first switch S1, the second switch S2, the third switch S3, the fourth switch S4, the fifth switch S5, the first energy switch SE, the first energy pre-charge switch SEP, the second energy switch SP, the second energy pre-charge switch SPP, and the relay switch SM.

At block 806, the converter control module 206 activates a first power feature ("Power Transfer") of the plurality of power features. At block 808, the converter control module 206 activates a second power feature ("Pre-charging") of the plurality of power features. At block 810, the converter control module 206 activates a third power feature ("Charging Second Vehicle ESS") of the plurality of power features. At block 812, the converter control module 206 activates a fourth power feature ("Charging from the Compatible Grid") of the plurality of power features. At block 814, the converter control module 206 activates a fifth power feature ("Charging from the Incompatible Grid") of the plurality of power features.

In the embodiment illustrated in FIG. 7B, the converter control module 206 activates the first, second, third, fourth and fifth power features via a process similar to the processes discussed in FIGS. 3B and 4, above. However, the converter control module 206 also controls the fifth switch S5 such that these power features can be active when the fifth switch is disabled. Further, the fourth power feature may also be active when the fifth switch S5 is enabled.

At block 816, the converter control module 206 activates a sixth power feature ("Charging from the Compatible Grid, and Charging Another Vehicle with an Incompatible Grid") of the plurality of power features. In one embodiment, the sixth power feature involves using power from the first charge port 104 of the first vehicle to charge, or supply power to, an element (e.g., the first voltage source V1, the second voltage source V2, or the load 326) of the fourth MFC unit configuration 700A, as well as to supply power to the charge port 332 of the second vehicle.

In this embodiment, the first charge port 104 of the first vehicle is connected to a compatible grid, while the second charge port 332 of the second vehicle is connected to an incompatible grid. As discussed above, a grid can be compatible with the first vehicle when the grid is able to directly supply the rated or recommended charging power of a vehicle. The grid can be incompatible with a vehicle when the grid lacks the capacity or infrastructure to support charging requirements of the vehicle.

For example, assuming that the first vehicle is designed to charge on 800 V and the second vehicle is designed to charge on 400 V, and assuming that the first charge port 104 of the first vehicle is connected to a charging station that supplies 800 V and the second charge port 332 of the second vehicle is connected to a charging station that supplies 240 V, the converter control module 206 may control the switches of the fourth MFC unit configuration 700A to supply 400 V to the second charge port, while also supplying power to the load 326.

In one embodiment, the converter control module 206 activates the sixth power feature by enabling the first switch S1, the second switch S2, the third switch S3, the fourth switch S4, and the first energy switch SE, and disabling the fifth switch S5, the relay switch SM, the second energy switch SP, first energy pre-charge switch SEP, and the second energy pre-charge switch SPP. When this power transfer feature is activated, the DC-DC converter 302 can be active.

At block 818, the converter control module 206 activates a seventh power feature ("Charging from an Incompatible Grid while Charging Another Vehicle with Another Incompatible Grid") of the plurality of power features. In one embodiment, the seventh power feature involves using power from the first charge port 104 of the first vehicle to charge, or supply power to, an element (e.g., the first voltage source V1, the second voltage source V2, or the load 326) of the fourth MFC unit configuration 700A, as well as to supply power to the charge port 332 of the second vehicle.

In this embodiment, the first charge port 104 of the first vehicle is connected to a first incompatible grid, and the second charge port 332 of the second vehicle is connected to a second incompatible grid. As discussed above, a grid can be incompatible with a vehicle when the grid lacks the capacity or infrastructure to support charging requirements of the vehicle.

For example, assuming that the first vehicle is designed to charge on 800 V and the second vehicle is designed to charge on 400 V, and assuming that the first charge port 104 of the first vehicle is connected to a charging station that supplies 400 V and the second charge port 332 of the second vehicle is connected to a charging station that supplies 240 V, the converter control module 206 may control the switches of the fourth MFC unit configuration 700A to supply 400 V to the second charge port, while also supplying power to the load 326.

In one embodiment, the converter control module 206 activates the first switch S1, the second switch S2, the third switch S3, the fourth switch S4, and the first energy switch SE, and disabling the fifth switch S5, the relay switch SM, the second energy switch SP, first energy pre-charge switch SEP, and the second energy pre-charge switch SPP. When this power transfer feature is activated, the DC-DC converter 302 can be active. The method 800 ends at block 820.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for activating a plurality of power features of a first vehicle, comprising:
    a processor;
    a multi-function converter unit comprising:
        a DC-DC converter including a first terminal, a second terminal, a third terminal, and a fourth terminal,
        a first electrical path including a first voltage source connected to a first energy switch, wherein the first electrical path is connected to the first terminal and the second terminal,
        a second electrical path including the first voltage source connected to a first pre-charge resistor connected to a first energy pre-charge switch, wherein the second electrical path is connected to the first terminal and the second terminal,
        a third electrical path including a second voltage source connected to a second energy switch, wherein the third electrical path is connected to the third terminal and the fourth terminal,
        a fourth electrical path including the second voltage source connected to a second energy pre-charge resistor connected to a second energy pre-charge switch, wherein the fourth electrical path is connected to the third terminal and the fourth terminal, and
        a relay switch connected to the fourth terminal; and
    memory or storage comprising an algorithm or computer instructions, which when executed by the processor, performs an operation comprising:
        controlling a plurality of switches of a multi-function converter unit configuration to activate at least one of the plurality of power features of the first vehicle, wherein the multi-function converter unit configuration includes the multi-function converter unit, the operation further comprising activating a first power feature of the plurality of power features, wherein the first power feature involves simultaneously charging an element of the multi-function converter unit configuration via a first grid that is compatible with the first vehicle and a charging a second vehicle via a second grid that is incompatible with the second vehicle.

2. The system of claim 1, the operation further comprising activating a second power feature of the plurality of power features, wherein the second power feature represents a power transfer between the first voltage source and the second voltage source of the multi-function converter unit configuration.

3. The system of claim 1, the operation further comprising activating a third power feature of the plurality of power features, wherein the third power feature represents a pre-charging of the first voltage source and the second voltage source of the multi-function converter unit configuration.

4. The system of claim 1, the operation further comprising activating a fourth power feature of the plurality of power features, wherein the fourth power feature involves charging of an energy storage system of the second vehicle.

5. The system of claim 1, the operation further comprising activating a fifth power feature of the plurality of power features, wherein the fifth power feature involves charging the element of the multi-function converter unit configuration via the first grid that is compatible with the first vehicle.

6. The system of claim 1, the operation further comprising activating a sixth power feature of the plurality of power features, wherein the sixth power feature involves charging the element of the multi-function converter unit configuration via the second grid that is incompatible with the first vehicle.

7. The system of claim 1, the operation further comprising activating a seventh power feature of the plurality of power features, wherein the seventh power feature involves simultaneously charging the element of the multi-function converter unit configuration via the second grid that is incompatible with the first vehicle and the charging the second vehicle via the second grid that is incompatible with the second vehicle.

8. The system of claim 1, wherein the multi-function converter unit configuration further includes:
    a first switch connected to a first charge port of the first vehicle and the first terminal;
    a second switch connected to the first charge port and the second terminal;
    a third switch connected to the first charge port and the third terminal;
    a fourth switch connected to the first charge port and the fourth terminal; and
    a load connected to the third terminal and the fourth terminal via the relay switch.

9. The system of claim 1, wherein the multi-function converter unit configuration further includes:
    a first switch connected to a second charge port of the second vehicle and the first terminal,
    a second switch connected to the second charge port and the second terminal;
    a third switch connected to a first charge port of the first vehicle and the third terminal,
    a fourth switch connected to the first charge port and the fourth terminal;
    a fifth switch connected to the first charge port and the first terminal; and
    a load connected to the third terminal and the fourth terminal via the relay switch.

10. A multi-function converter unit for activating a plurality of power features of a first vehicle, comprising:
    a DC-DC converter including a first terminal, a second terminal, a third terminal, and a fourth terminal;
    a first electrical path including a first voltage source connected to a first energy switch, wherein the first electrical path is connected to the first terminal and the second terminal;
    a second electrical path including the first voltage source connected to a first pre-charge resistor connected to a first energy pre-charge switch, wherein the second electrical path is connected to the first terminal and the second terminal;

a third electrical path including a second voltage source connected to a second energy switch, wherein the third electrical path is connected to the third terminal and the fourth terminal;

a fourth electrical path including the second voltage source connected to a second energy pre-charge resistor connected to a second energy pre-charge switch, wherein the fourth electrical path is connected to the third terminal and the fourth terminal; and a relay switch connected to the fourth terminal, wherein a plurality of switches of a multi-function converter unit configuration can be controlled to activate at least one of the plurality of power features of the first vehicle, wherein the multi-function converter unit configuration includes the multi-function converter unit and wherein the multi-function converter unit configuration can be further controlled to activate a first power feature of the plurality of power features, wherein the first power feature involves simultaneously charging an element of the multifunction converter unit configuration via a first grid that is incompatible with the first vehicle and a charging a second vehicle via a second grid that is incompatible with the second vehicle.

11. The multi-function converter unit of claim 10, wherein the multi-function converter unit configuration can be further controlled to activate a second power feature of the plurality of power features, wherein the second power feature represents a power transfer between the first voltage source and the second voltage source of the multi-function converter unit configuration.

12. The multi-function converter unit of claim 10, wherein the multi-function converter unit configuration can be further controlled to activate a third power feature of the plurality of power features, wherein the third power feature represents a pre-charging of the first voltage source and the second voltage source of the multi-function converter unit configuration.

13. The multi-function converter unit of claim 10, wherein the multi-function converter unit configuration can be further controlled to activate a fourth power feature of the plurality of power features, wherein the fourth power feature involves charging of an energy storage system of the second vehicle.

14. The multi-function converter unit of claim 10, wherein the multi-function converter unit configuration can be further controlled to activate a fifth power feature of the plurality of power features, wherein the fifth power feature involves charging the element of the multi-function converter unit configuration via the second grid that is compatible with the first vehicle.

15. The multi-function converter unit of claim 10, wherein the multi-function converter unit configuration can be further controlled to activate a sixth power feature of the plurality of power features, wherein the sixth power feature involves charging the element of the multi-function converter unit configuration via the first grid that is incompatible with the first vehicle.

16. The multi-function converter unit of claim 10, wherein the multi-function converter unit configuration can be further controlled to activate a seventh power feature of the plurality of power features, wherein the seventh power feature involves simultaneously charging the element of the multi-function converter unit configuration via the second grid that is compatible with the first vehicle and the charging the second vehicle via the second grid that is incompatible with the second vehicle.

17. The multi-function converter unit of claim 10, wherein the multi-function converter unit configuration further includes:
   a first switch connected to a first charge port of the first vehicle and the first terminal;
   a second switch connected to the first charge port and the second terminal;
   a third switch connected to the first charge port and the third terminal;
   a fourth switch connected to the first charge port and the fourth terminal; and
   a load connected to the third terminal and the fourth terminal via the relay switch.

18. The multi-function converter unit of claim 10, wherein the multi-function converter unit configuration further includes:
   a first switch connected to a second charge port of the second vehicle and the first terminal,
   a second switch connected to the second charge port and the second terminal;
   a third switch connected to a first charge port of the first vehicle and the third terminal,
   a fourth switch connected to the first charge port and the fourth terminal;
   a fifth switch connected to the first charge port and the first terminal; and
   a load connected to the third terminal and the fourth terminal via the relay switch.

19. A system for activating a plurality of power features of a first vehicle, comprising:
   a processor;
   a multi-function converter unit comprising:
      a DC-DC converter including a first terminal, a second terminal, a third terminal, and a fourth terminal,
      a first electrical path including a first voltage source connected to a first energy switch, wherein the first electrical path is connected to the first terminal and the second terminal,
      a second electrical path including the first voltage source connected to a first pre-charge resistor connected to a first energy pre-charge switch, wherein the second electrical path is connected to the first terminal and the second terminal,
      a third electrical path including a second voltage source connected to a second energy switch, wherein the third electrical path is connected to the third terminal and the fourth terminal,
      a fourth electrical path including the second voltage source connected to a second energy pre-charge resistor connected to a second energy pre-charge switch, wherein the fourth electrical path is connected to the third terminal and the fourth terminal, and
      a relay switch connected to the fourth terminal; and
   memory or storage comprising an algorithm or computer instructions, which when executed by the processor, performs an operation comprising:
   controlling a plurality of switches of a multi-function converter unit configuration to activate at least one of the plurality of power features of the first vehicle, wherein the multi-function converter unit configuration includes the multi-function converter unit, the operation further comprising activating a first power feature of the plurality of power features, wherein the first power feature involves simultaneously charging an element of the multi-function converter unit configuration via a first grid and a charging a second vehicle via a second grid that is incompatible with the second vehicle.

20. The system of claim 19, where the first grid is not compatible with the first vehicle.

\* \* \* \* \*